Oct. 18, 1955     F. V. COLLINS     2,721,267
ELECTRONIC TEMPERATURE INDICATOR
Filed April 5, 1952
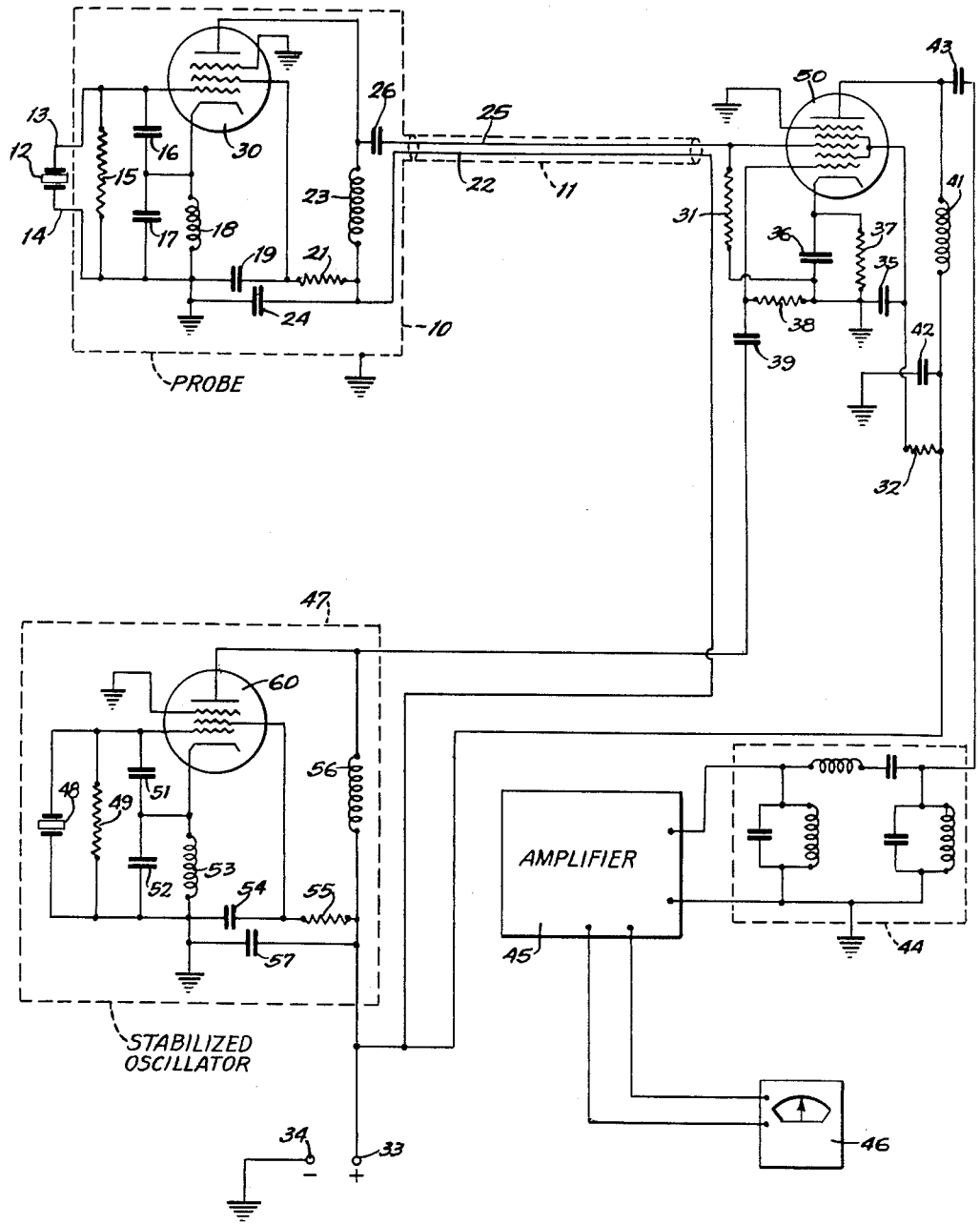
INVENTOR:
Fred V. Collins,
BY
Dawson & Ooms,
ATTORNEYS.

2,721,267
ELECTRONIC TEMPERATURE INDICATOR

Fred V. Collins, Des Plaines, Ill., assignor to William F. Stahl, Kenilworth, Ill.

Application April 5, 1952, Serial No. 280,835

2 Claims. (Cl. 250—36)

This invention relates to temperature-indicating devices; in particular, it relates to a novel electronic thermometer which is characterized by a high order of sensitivity and extraordinary accuracy.

My invention makes use of the physical and electric properties of piezo-electric crystal oscillators to produce a temperature-indicating device in which both the sensitivity to changes in temperature and the accuracy of indication can be made far greater than in conventional apparatus.

It is accordingly the principal object of the present invention to provide an electric temperature indicator or thermometer in which the temperature-responsive characteristics of piezo-electric crystal oscillators are employed.

It is a further object of my invention to provide a temperature-indicating device in which the temperature may be measured by comparing the frequency of a crystal oscillator exposed to the temperature being measured with the frequency of a standard stabilized crystal oscillator.

Another object of my invention is to provide, in such a temperature indicator, a temperature-sensitive probe especially adapted to accomplish rapid change of oscillator frequency in response to changes in temperature in the zone being observed.

Other objects and advantages in the present invention will appear from the detailed description of the invention which follows.

I have shown in schematic form in the accompanying drawing an illustrative embodiment of my invention. The single figure of the drawing shows a schematic diagram which, taken with the following description in the specification, will readily enable persons skilled in the art to understand fully my invention and its operation.

In the drawing, I have shown a dotted enclosure 10 marked "probe." That portion of my invention should, in a physical embodiment, be formed in a relatively compact casing, adapted to convenient handling, and connected with the remainder of the apparatus by a suitable connecting cable 11, which may be of any desired length up to several feet.

The remainder of the apparatus, shown in the drawing in schematic form, may be permanently installed, as in a rack, if the electronic thermometer of my invention is being used as a continuous temperature indicator in some fixed location such as an industrial plant or laboratory. On the other hand, if my apparatus is to be used in portable applications, the apparatus apart from the probe 10 and the cable 11 may be mounted in a small hand carrying-case such as is used for electronic test equipment. The type of power supply employed, of course, will depend on the intended application. In permanent installations, a transformer-rectifier supply will normally be indicated, while a battery supply will prove entirely satisfactory if operation independently of a power line is desired.

The physical construction of the probe 10 may take any desired form, so long as special precautions are taken to place the piezo-electric crystal 12 in a position wherein it is protected from mechanical damage and at the same time exposed as fully as possible to the temperature conditions existing in the zone immediately surrounding the probe. This is preferably accomplished by mounting crystal 12 in a small forward extension of probe 10, supporting the crystal on stiff but light wire supports and protecting it with a thin shield of material which will not conduct heat effectively. I prefer a thin protective housing of high-temperature plastic or ceramic material, preferably formed as a skeleton with many relieved areas to facilitate free circulation of air between the zone under examination and the crystal 12.

The piezo-electric crystal 12 used for the present application should be as small in physical size as is convenient and should be of the type having an extremely thin metal coating deposited on its parallel faces, the crystal being suspended between two wire leads joined electrically and mechanicaly to the metallic faces. This construction will provide the smallest possible degree of heat inertia and will thereby greatly facilitate rapid response of the crystal 12 to temperature changes.

Furthermore, crystal 12 should be cut from the parent crystal at an angle such that the frequency of oscillation is affected greatly by temperature. While my invention will work well with any such crystal, the problem of calibration is simplified if the crystal's temperature characteristics are substantially linear over a wide range of temperatures.

Extensive work has been done in the field of fashioning piezo-electric oscillators from parent crystals of quartz, tourmaline, and other mineral crystals. It is unnecessary, therefore, to describe in detail the appropriate cutting angle, etc., of the crystal 12. On the basis of the requirements set forth in the foregoing paragraphs, any person skilled in the art of grinding piezo-electric crystals could provide a suitable crystal.

The wire leads 13 and 14 which support crystal 12 within the forward end of probe 10 serve also to provide electrical contact with the crystal faces. Conductor 13 extends from one face of crystal 12 into the interior of probe 10, terminating at the control grid of tube 30. The other crystal-supporting wire 14 extends within probe 10 and is there grounded.

Gridleak resistor 15 is connected between the grid of tube 30 and ground, and capacitors 16 and 17 are connected in series between the same two points. The cathode of tube 30 is connected to ground through inductor 18, the cathode being also connected to the junction of capacitors 16 and 17.

The screen grid of tube 30 is by-passed to ground by capacitor 19 and is also connected through resistor 21 to cable wire 22 within cable 11.

The suppressor grid of tube 30, if there be one, may be grounded. The plate of tube 30 is connected through choke coil 23 to cable lead 22, cable lead 22 being by-passed to ground by capacitor 24.

Cable 11 may be of the shielded type having a grounded braid covering over the conductors therewithin. Cable conductor 25 is connected within probe 10 to the plate of tube 30 through coupling capacitor 26, the other end of cable lead 25 being connected to the injector grid of tube 50.

In addition to leads 22 and 25, cable 11 will normally contain at least one additional lead (not shown) carrying heater current for tube 30. I have not shown in the drawing the heater source or connecting leads for either tube 30 or any of the other tubes in the circuit. It will be understood that such heater connections are to be made in the conventional manner.

Gridleak resistor 31 is connected between the injector grid of tube 50 and ground. The screen grid of tube 50 is connected through resistor 32 to the positive terminal 33 of a suitable D. C. power supply (not shown). Cable lead 22 is also connected to positive terminal 33. The negative terminal 34 of the D. C. power supply is grounded.

The screen grid and the cathode of tube 50 are by-passed to ground by capacitors 35 and 36 respectively. Capacitor 36 is shunted by cathode-bias resistor 37. The control grid of tube 50 is connected to ground through gridleak resistor 38 and is connected through coupling capacitor 39 to the plate of tube 60. The suppressor grid of tube 50, if there be one, may be grounded.

The plate of tube 50 is connected through choke coil 41 to positive terminal 33, which is by-passed to ground by capacitor 42.

The plate of tube 50 is connected through coupling capacitor 43 to the input of a band-pass filter 44, the output thereof being fed to a conventional electronic amplifier 45.

The output of amplifier 45 is fed to a direct-reading frequency meter 46, which may be of the type used in broadcast stations to indicate the number of cycles deviation of the carrier frequency from a standard-frequency source.

The dotted enclosure 47 denotes the separate housing of a stabilized crystal oscillator. This oscillator may have a frequency close to the frequency of the probe oscillator, and it is desirable that considerable precaution be taken to insure as nearly perfect frequency stability as possible. The crystal 48 used in the oscillator 47 should be of the zero-cut type which is substantially unresponsive to changes in temperatures. In addition, it is desirable that the oscillator elements be housed in a mechanically strong, heat-insulated chamber which, if facilities permit, may be maintained at a constant internal temperature by means of a suitable heat source.

In practice, it is not necessary for most applications that the oscillator 47 be temperature-controlled. A satisfactory degree of oscillator stability can be obtained by using a zero-cut crystal 48 and a well-insulated housing 47.

The circuit of oscillator 47 is conventional. Gridleak resistor 49 is connected in parallel with crystal 48, both elements being connected between the control grid of tube 60 and ground. Capacitors 51 and 52 are also connected in series between the control grid of tube 60 and ground. The cathode of tube 60 is connected to ground through inductor 53, and is also connected to the junction of capacitors 51 and 52.

The screen grid of tube 60 is by-passed to ground through capacitor 54 and is connected to positive terminal 33 through resistor 55. The suppressor grid of tube 60, if there be one, may be grounded.

The plate of tube 60 is connected through choke coil 56 to positive terminal 33, capacitor 57 providing an additional by-pass to ground for positive terminal 33.

In the foregoing description of a typical embodiment of my invention, I have not assigned specific numerical values to the circuit elements used, since those elements are not critical and my invention does not depend on the use of particular values.

*Operation*

In the operation of my invention, the oscillator 47 generates a constant-frequency reference signal which is fed into the control grid of mixer tube 50. At the same time, a signal from probe oscillator 10 is applied to the injector grid. Those signals are mixed in the plate circuit of the mixer tube 50, and the sum or difference frequencies, all of which will lie within a narrow band encompassed by filter 44, are separated out and fed to amplifier 45. The calibration of frequency meter 46 may of course be accomplished in terms of temperature, since the frequency of the signal fed to frequency meter 46 will be a function of the temperature of crystal 12.

In use, the probe 10, particularly the forward portion thereof which houses crystal 12, is placed in the zone whose temperature is to be observed. The frequency of crystal 12 changes in accordance with the temperature and the resulting change in frequency of the signal meter 46 will cause an appropriate change in the temperature reading on the scale thereof.

While I have in this specification described in considerable detail a particular embodiment of my invention, it is to be understood that many changes may be made therein without departing from the spirit of my invention. It is accordingly my desire that the scope of my invention be determined primarily with reference to the appended claims.

I claim:

1. In temperature-indicating apparatus having a probe equipped with a temperature responsive element adapted to be subjected to the temperature to be measured, said probe comprising an electron discharge device having a cathode, anode and control grid, a piezo-electric crystal electrically connected between said cathode and control grid, said crystal having an angularly oriented axis selected so that the oscillator frequency of the crystal varies with changes in temperature, resistance and capacitance elements in parallel with said crystal, choke means in circuit with said cathode, and an inductance and capacitance in said anode circuit, said capacitance being adapted to couple said probe to a mixer device.

2. The temperature-indicating apparatus of claim 1 in which said electron discharge device is provided with a screen grid coupled to said cathode through a capacitor and through said choke means.

References Cited in the file of this patent

UNITED STATES PATENTS

| | | |
|---|---|---|
| 2,017,859 | Halstead | Oct. 22, 1935 |
| 2,155,035 | Bieling | Apr. 18, 1939 |
| 2,270,906 | McSkimin | Jan. 17, 1942 |
| 2,439,130 | Firestone | Apr. 6, 1948 |
| 2,496,975 | Bach | Feb. 7, 1950 |
| 2,536,111 | Van Dyke | Jan. 2, 1951 |

FOREIGN PATENTS

| | | |
|---|---|---|
| 545,832 | Great Britain | June 15, 1942 |

OTHER REFERENCES

Mechanical Measurements by Electrical Methods, Roberts. Instruments Publishing Co., Inc., Pittsburgh, 1946, pages 88, 89, 228.